US009616783B2

(12) United States Patent
Ito (10) Patent No.: US 9,616,783 B2
(45) Date of Patent: Apr. 11, 2017

(54) SEAT DRIVING APPARATUS

(71) Applicant: Aisin Seiki Kabushiki Kaisha, Kariya-shi (JP)

(72) Inventor: Sadao Ito, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 91 days.

(21) Appl. No.: 14/699,032

(22) Filed: Apr. 29, 2015

(65) Prior Publication Data
US 2015/0329020 A1    Nov. 19, 2015

(30) Foreign Application Priority Data
May 13, 2014    (JP) ................................. 2014-099850

(51) Int. Cl.
| | |
|---|---|
| *B60N 2/00* | (2006.01) |
| *B60N 2/44* | (2006.01) |
| *B60N 2/22* | (2006.01) |
| *B60N 2/06* | (2006.01) |
| *B60N 2/02* | (2006.01) |

(52) U.S. Cl.
CPC .......... *B60N 2/4435* (2013.01); *B60N 2/0296* (2013.01); *B60N 2/06* (2013.01); *B60N 2/2213* (2013.01)

(58) Field of Classification Search
CPC ...... B60N 2/4435; B60N 2/06; B60N 2/2213; B60N 2/0296
See application file for complete search history.

(56) References Cited

U.S. PATENT DOCUMENTS

| | | | |
|---|---|---|---|
| 6,553,866 B1 | 4/2003 | Ursel et al. | |
| 2014/0238188 A1* | 8/2014 | Ito .................... | B60N 2/0228 74/664 |
| 2015/0321581 A1* | 11/2015 | Ito ........................ | H02K 7/10 318/3 |

FOREIGN PATENT DOCUMENTS

| | | | | |
|---|---|---|---|---|
| JP | WO 2013061715 A1 * | 5/2013 | ........... | B60N 2/0228 |
| JP | 2013-107624 | 6/2013 | | |

OTHER PUBLICATIONS

U.S. Appl. No. 14/699,052, filed Apr. 29, 2015, Ito.

* cited by examiner

*Primary Examiner* — Victor MacArthur
(74) *Attorney, Agent, or Firm* — Oblon, McClelland, Maier & Neustadt, L.L.P.

(57) ABSTRACT

A seat driving apparatus includes: a tubular member into which an output shaft is fitted, into which an input shaft is fitted, and which includes a tubular portion and a pressing piece; a first biasing member biasing the tubular member in an axial line direction toward the input shaft; an intermediary member into which the tubular portion is loosely inserted and which is turnable about an axial line extending in a direction different from a direction of an axial line of the tubular member; a cam member supported turnably around an axial line extending in a direction different from the directions of the axial lines of the tubular member and the intermediary member, pressing the pressing piece via the intermediary member, and allowing the input shaft to fit into the tubular member; and a second biasing member biasing the cam member, wherein a counterface of the intermediary member pressing the pressing piece includes a curved surface.

6 Claims, 8 Drawing Sheets

FRONT-BACK DIRECTION

FIG.8

FRONT-BACK DIRECTION

SEAT DRIVING APPARATUS

CROSS REFERENCE TO RELATED APPLICATIONS

This application is based on and claims priority under 35 U.S.C. §119 to Japanese Patent Application 2014-099850, filed on May 13, 2014, the entire contents of which are incorporated herein by reference.

TECHNICAL FIELD

This disclosure relates to a seat driving apparatus in which a positional adjustment mechanism is activated.

BACKGROUND DISCUSSION

JP 2013-107624A (Reference 1, FIGS. 36 to 38) discloses a known seat driving apparatus in the related art, for example. The apparatus includes a worm wheel that is an input shaft rotationally driven by the rotary motor, and for example, a tubular member into which a lifter shaft that is an output shaft linked to a lifter mechanism is fitted so as to integrally rotate therewith and to be relatively movable in an axial line direction. The tubular member includes a tubular portion and a flange-like pressing piece which protrudes outwardly from the tubular portion. The tubular member is fitted so as to cause the worm wheel to be integrally rotated in response to movement in the axial line direction toward the worm wheel. The tubular member is biased in the axial line direction toward the worm wheel by a compression spring interposed between the tubular member and the lifter shaft.

The seat driving apparatus includes an intermediary member into which the tubular portion is loosely inserted and which is turnable about an axial line extending in a direction different from a direction of an axial line of the tubular member, and a cam member which is turnable about an axial line extending in a direction different from the directions of the axial line of the tubular member and the axial line of the intermediary member. The cam member presses the pressing piece via a distal end portion of the intermediary member so as to release the fitted worm wheel from the tubular member against biasing force of the compression spring by pressing the distal end portion of the intermediary member when being at a neutral position. The cam member allows the worm wheel to fit into the tubular member biased by the compression spring in response to turning force from the neutral position. The cam member is biased so as to be held at the neutral position.

Incidentally, according to Reference 1, for example, there is a case where the tubular member and the worm wheel mesh with each other when being integrally rotated. Such meshing becomes evident in the upper limit and the lower limit within a range of positional adjustment, for example, by being applied with an excessive load when the turning of the lifter shaft is locked. At this time, there is a possibility that the fitted worm wheel is unlikely to be released from the tubular member. Meanwhile, it may be considered to cope therewith by increasing the biasing force for holding (restoring) the cam member at the neutral position. However, in this case, another disadvantage is caused in that operation force for turning the cam member from the neutral position increases.

SUMMARY

Thus, a need exists for a seat driving apparatus which is not suspectable to the drawback mentioned above.

An aspect of this disclosure is directed to a seat driving apparatus including a tubular member into which an output shaft leading to a positional adjustment mechanism is fitted, in which the output shaft integrally rotate therewith and is relatively movable in an axial line direction, into which an input shaft is fitted, in which integrally rotate therewith in response to movement in the axial line direction toward the input shaft rotationally driven by a rotary motor, and which includes a tubular portion and a pressing piece protruding outwardly from the tubular portion, a first biasing member that biases the tubular member in the axial line direction toward the input shaft, an intermediary member into which the tubular portion is loosely inserted and which is turnable about an axial line extending in a direction different from a direction of an axial line of the tubular member; a cam member that is supported turnably around an axial line extending in a direction different from the directions of the axial line of the tubular member and the axial line of the intermediary member, presses the pressing piece via the intermediary member so as to release the fitted input shaft from the tubular member against biasing force of the first biasing member by pressing a distal end portion of the intermediary member being separated from the axial line of the intermediary member when being at a neutral position, and allows the input shaft to fit into the tubular member biased by the first biasing member in response to turning force from the neutral position; and a second biasing member that biases the cam member so as to be held at the neutral position. A counterface of the intermediary member pressing the pressing piece includes a curved surface causing a pressing portion with which the pressing piece presses the intermediary member, to be separated from the axial line of the intermediary member in accordance with the cam member turning toward the neutral position.

BRIEF DESCRIPTION OF THE DRAWINGS

The foregoing and additional features and characteristics of this disclosure will become more apparent from the following detailed description considered with the reference to the accompanying drawings, wherein:

FIGS. 6A and 6B are arrow views of the arrow A in FIG. 3, FIG. 6A illustrates a non-operation state of operation handles, and FIG. 6B illustrates an operation state of the operation handles;

DETAILED DESCRIPTION

Hereinafter, an embodiment of a seat driving apparatus will be described.

Figure 1:
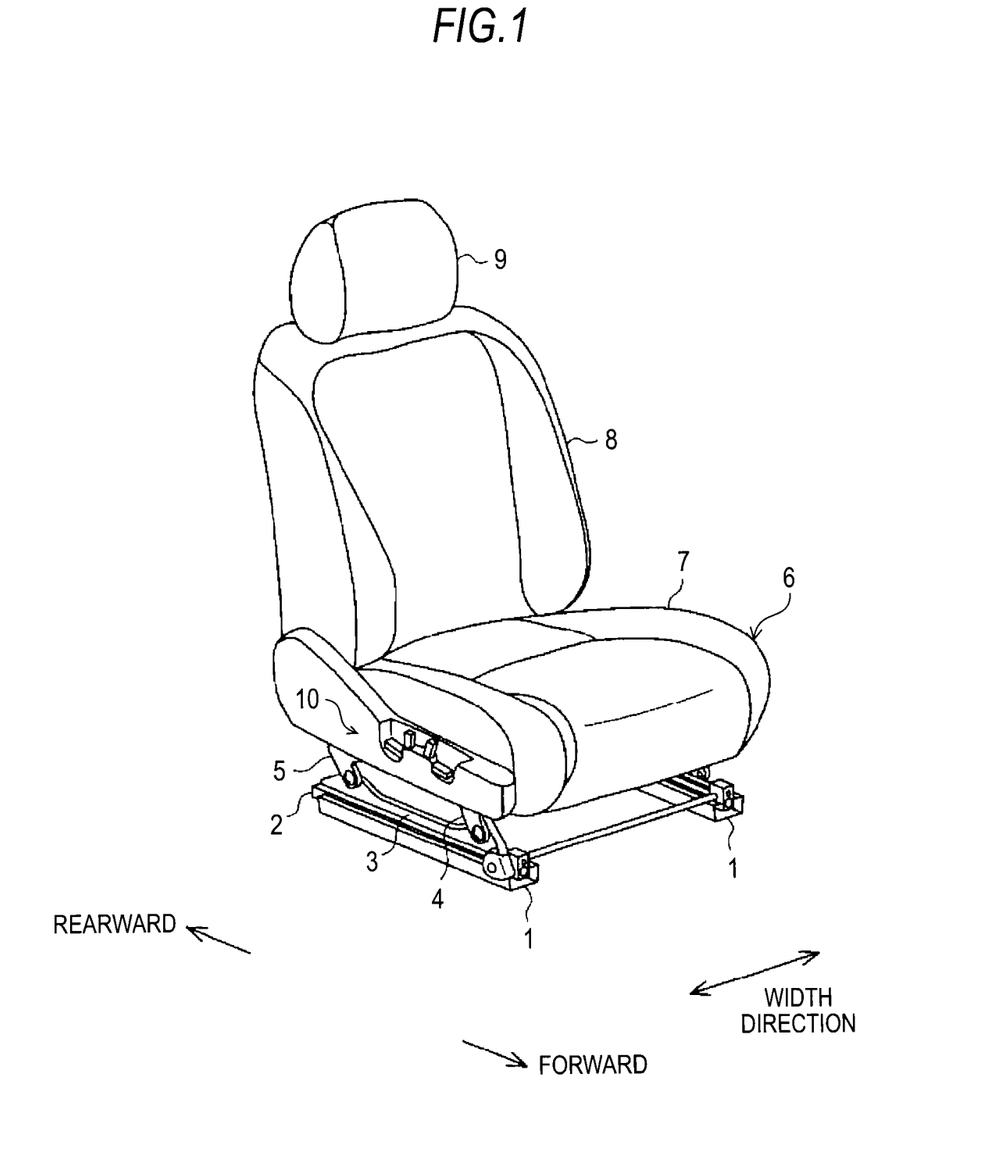
FIG. 1 is a perspective view of an eight-way power seat in which an embodiment of this disclosure is applied.

As illustrated in FIG. 1, a pair of lower rails 1 which are arranged side by side in a width direction of a seat and extend in a front-back direction are fixed to the floor of a vehicle, and an upper rail 2 is movably mounted on each of the two lower rails 1 in the front-back direction.

A bracket 3 made with a plate member stands on each of the two upper rails 2. A seat 6 forming a seating portion for an occupant is supported by each of the two brackets 3 via a front link 4 and a rear link 5 which are respectively arranged in the front portion and the rear portion. The seat 6 is configured to include a seat cushion 7 forming a seating surface, a seatback 8 tiltably (turnably) supported by a rear end portion of the seat cushion 7, and a headrest 9 supported by an upper end portion of the seatback 8.

A front-back position of the seat 6 is adjustable by relatively moving the lower rails 1 and the upper rails 2 on both sides, and a vertical position thereof is adjustable by lifting and lowering the front links 4 and the rear links 5 on both sides. In the seat 6, a tilt angle of the front portion of the seat cushion 7 is adjustable with respect to the rear portion thereof, and a tilt angle of the seatback 8 is adjustable with respect to the seat cushion 7. Accordingly, a person sitting on the seat 6 can adjust a position of an eye level in accordance with one's physical stature, for example.

Figure 2:
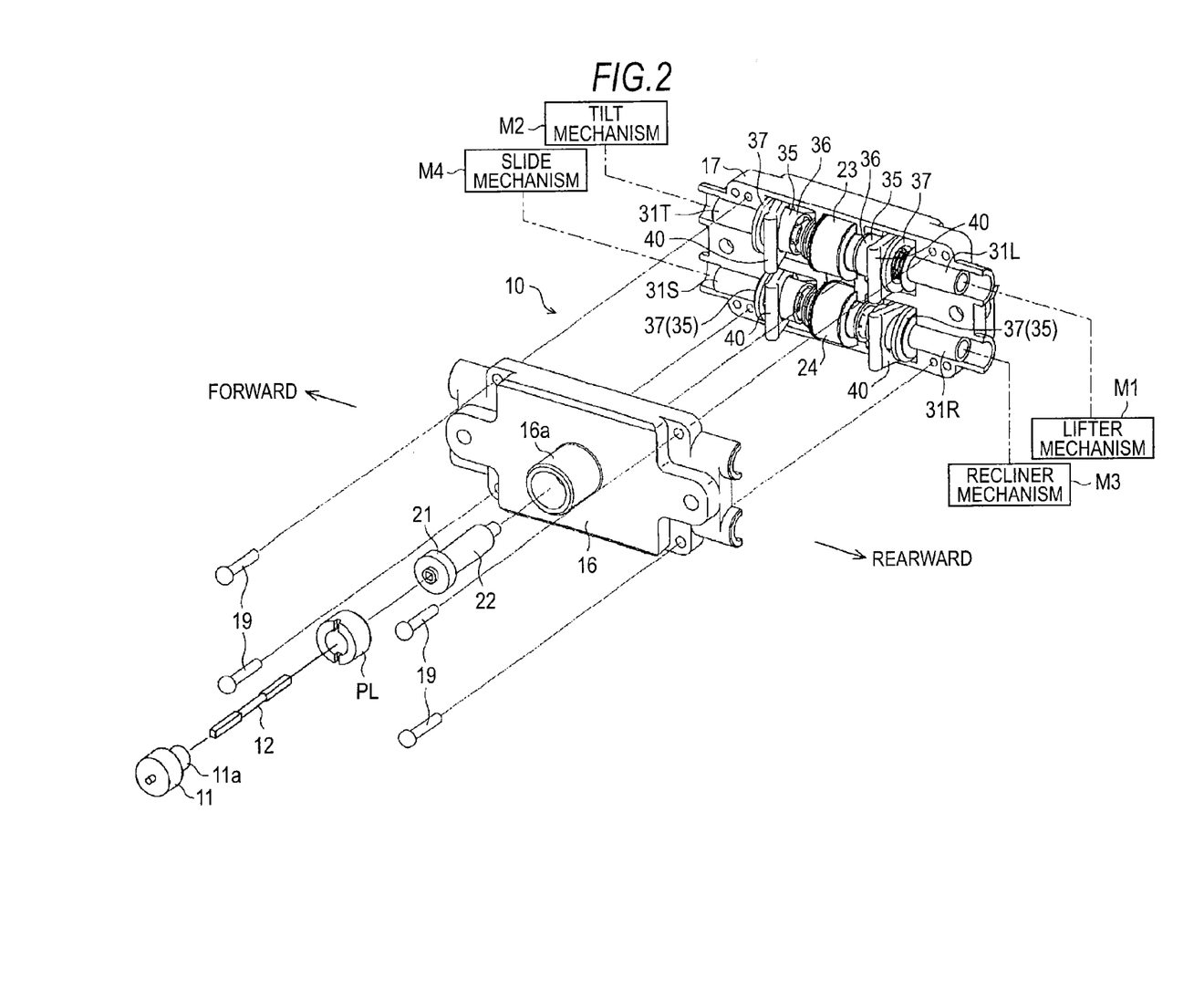
FIG. 2 is an exploded perspective view illustrating the same embodiment.

A driving apparatus 10 is attached to a side portion on one side of the seat cushion 7 (on the right side toward the front of the seat). As illustrated in FIG. 2, the driving apparatus 10 is joined to a rotary axis 11a of a rotary motor 11 configured to be a brush motor, for example, of which the axial line extends in substantially the width direction of the seat, so as to be driven therewith, via an input torque cable 12 which is coaxial with the rotary axis 11a.

In detail, the driving apparatus 10 includes a pair of main body cases 16 and 17 which are split into halves in an axial line direction of the rotary axis 11a. The main body cases 16 and 17 are fastened with four screws 19 which penetrate four corners of the main body cases in parallel to the axial line direction of the rotary axis 11a.

A substantially cylindrical holding portion 16a which is concentric with the input torque cable 12 (the rotary axis 11a) protrudes from a main body case 16 on the rotary motor 11 side. Inside the holding portion 16a, an annular bearing 21 is fitted and a substantially cylindrical bottomed plug PL is screwed thereto. A base end portion of a worm 22 disposed coaxially with the input torque cable 12 is pivotally supported by the bearing 21. The worm 22 is joined to the input torque cable 12 inserted through the plug PL, at the base end portion of the worm 22 so as to integrally rotate therewith. A distal end portion of the worm 22 is pivotally supported by a main body case 17 on a side away from the rotary motor 11.

A pair of worm wheels 23 and 24 of which axial lines respectively extend in the front-back direction on an upper side and a lower side of the worm 22 are arranged in the main body cases 16 and 17, as the input shafts. The worm wheels 23 and 24 mesh with the worm 22 at skew positions differing from each other with respect to the worm 22. The worm wheels 23 and 24 are mutually set at an equivalent reduction ratio of 1 or greater.

Figure 7:
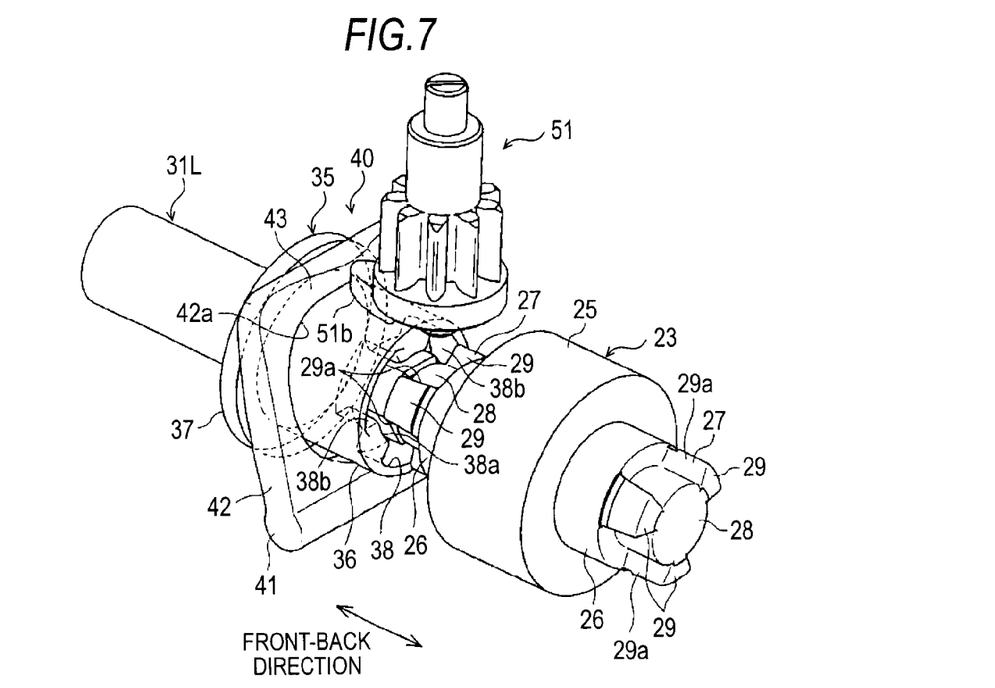
FIG. 7 is a perspective view illustrating the same embodiment.
Figure 8:
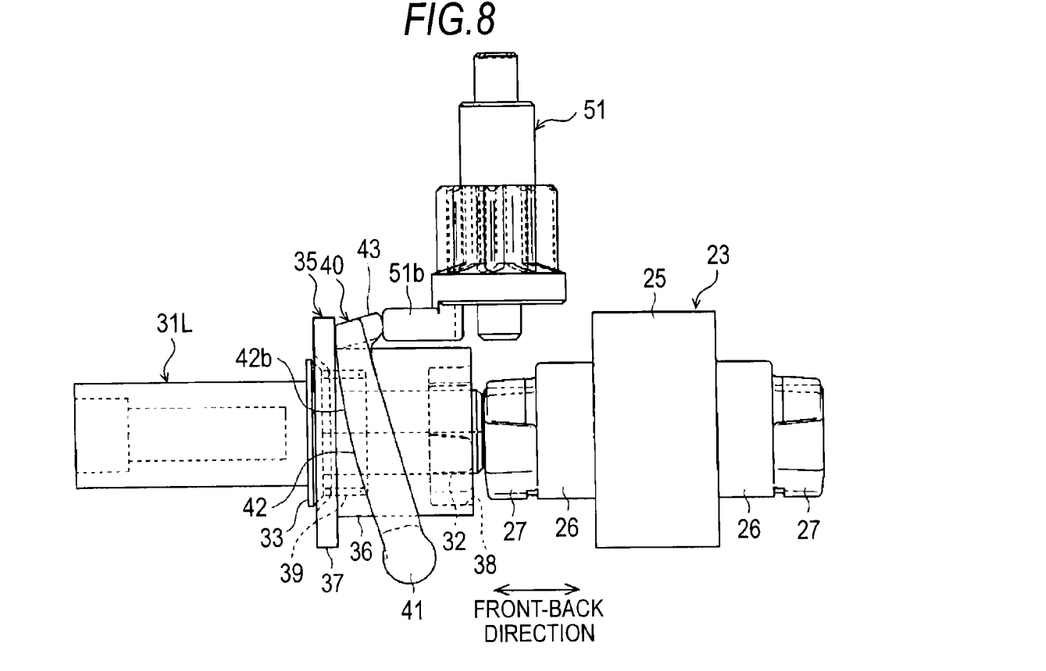
FIG. 8 is a plan view illustrating the same embodiment.

As collectively illustrated in FIGS. 7 and 8, one worm wheel 23 includes a gear portion 25 which meshes with the worm 22 on its upper side, includes a pair of shaft portions 26 protruding on the rear side and the front side of the gear portion 25 so as to be pivotally supported by the main body cases 16 and 17, and includes a pair of fitting portions 27 protruding respectively on the rear side and the front side of the two shaft portions 26. The outer shape of each fitting portion 27 exhibits a substantially three-vane shape in which a columnar shape 28 and three arc columnar shapes 29 extending from the columnar shape 28 in the radial direction at equivalent angles are combined. In each of the arc columnar shapes 29, a pair of gradual change portions 29a are formed on both side portions thereof in the circumferential direction so as to be gradually decreased in width in the circumferential direction toward the distal end. Accordingly, in each of the arc columnar shapes 29, in a strict sense, the distal end is slightly decreased in width in the circumferential direction compared to the proximal end. The other worm wheel 24 is also configured to have the same configuration, and the gear portion 25 thereof meshes with the worm 22 on the lower side thereof.

As illustrated in FIG. 2, a lifter shaft 31L and a tilt shaft 31T as the output shafts are respectively and pivotally supported by the main body cases 16 and 17 on the rear side and the front side of the worm wheel 23 coaxially with the worm wheel 23 in postures symmetrical with each other. The lifter shaft 31L is linked to a lifter mechanism M1 which is the positional adjustment mechanism adjusting the vertical position of the seat 6. The tilt shaft 31T is linked to a tilt mechanism M2 which is the positional adjustment mechanism adjusting the tilt angle of the front portion of the seat cushion 7 with respect to the rear portion thereof.

Moreover, a recliner shaft 31R and a slide shaft 31S as the output shafts are respectively and pivotally supported by the main body cases 16 and 17 on the rear side and the front side of the worm wheel 24 coaxially with the worm wheel 24 in postures symmetrical with each other. The recliner shaft 31R is linked to a recliner mechanism M3 which is the positional adjustment mechanism adjusting the tilt angle of the seatback 8 with respect to the seat cushion 7. The slide shaft 31S is linked to a slide mechanism M4 which is the positional adjustment mechanism adjusting the front-back position of the seat 6.

Therefore, when any one of the lifter shaft 31L, the tilt shaft 31T, the recliner shaft 31R, and the slide shaft 31S turns, the corresponding lifter mechanism M1, tilt mechanism M2, recliner mechanism M3, or slide mechanism M4 is activated, thereby being adjusted to the intended seat position. In other words, in the embodiment, the seat position can be adjusted in the forward direction and the reverse direction in each of the lifter mechanism M1, the tilt mechanism M2, the recliner mechanism M3, and the slide mechanism M4, that is, a so-called eight-way power seat.

The lifter shaft 31L, the tilt shaft 31T, the recliner shaft 31R, and the slide shaft 31S have the same structure except for their disposition states and the like. Therefore, the peripheral structure of the lifter shaft 31L will be described below as being representative.

As illustrated in FIGS. 7 and 8, the lifter shaft 31L exhibits a substantially columnar shape, and the distal end portion of the lifter shaft 31L extending from a bearing portion of the main body cases 16 and 17 to a side facing the worm wheel 23 forms an output shaft side fitting portion 32. The lifter shaft 31L also includes an outward flange 33 protruding in an intermediate portion in the axial line direction adjacent to the bearing portion of the main body cases 16 and 17.

A tubular member 35 is interposed between the fitting portion 27 of the worm wheel 23 and the flange 33 of the lifter shaft 31L. The tubular member 35 includes a tubular portion 36 and a flange-shaped pressing piece 37 protruding outward in the radial direction from the distal end facing the lifter shaft 31L of the tubular portion 36. The output shaft side fitting portion 32 is fitted into the tubular member 35 so as to integrally rotate with the lifter shaft 31L and to be movable in the axial line direction with respect to the lifter shaft 31L. A fitting hole 38 which can house the fitting portion 27 is formed in the tubular member 35. In other words, the fitting hole 38 exhibits a shape in combination of a circular hole 38a in which the columnar shape 28 of the fitting portion 27 is fitted and three arc holes 38b in which the three arc columnar shapes 29 are fitted. The tubular member 35 moves to the worm wheel 23 side in the axial line direction, thereby causing the fitting hole 38 to house the fitting portion 27 so as to integrally rotate with the worm wheel 23.

In other words, rotational force of the worm wheel 23 can be transmitted to the lifter shaft 31L via the tubular member 35 as the fitting portion 27 fits in the fitting hole 38 in response to the movement of the tubular member 35. As a fitted state between the fitting portion 27 and the fitting hole 38 is released, rotational force thereof cannot be transmitted to the lifter shaft 31L via the tubular member 35. The lifter mechanism M1 is activated in response to the turning of the lifter shaft 31L as described above. The fitting portion 27 of the worm wheel 23, and the output shaft side fitting portion 32 and the tubular member 35 of the lifter shaft 31L configure the clutch mechanism which selectively connects the worm wheel 23 and the lifter shaft 31L.

The output shaft side fitting portion 32 of the lifter shaft 31L is inserted through a compression spring 39 which is a first biasing member formed with a coil spring which is interposed between the tubular member 35 and the flange 33 on an inner circumferential side of the pressing piece 37. The tubular member 35 is biased at all times to a side in which the fitting hole 38 houses in the fitting portion 27 of the worm wheel 23 due to the compression spring 39, that is, a side in which rotational force of the worm wheel 23 can be transmitted to the lifter shaft 31L. In other words, in a state where rotational force of the worm wheel 23 cannot be transmitted to the lifter shaft 31L, the tubular member 35 moves to a side in which a fitting state between the fitting portion 27 and the fitting hole 38 is released against biasing force of the compression spring 39.

The same clutch mechanism is configured between the worm wheel 23 and the tilt shaft 31T, between the worm wheel 24 and the recliner shaft 31R, and between the worm wheel 24 and the slide shaft 31S so as to selectively connect them with each other.

Figure 4:
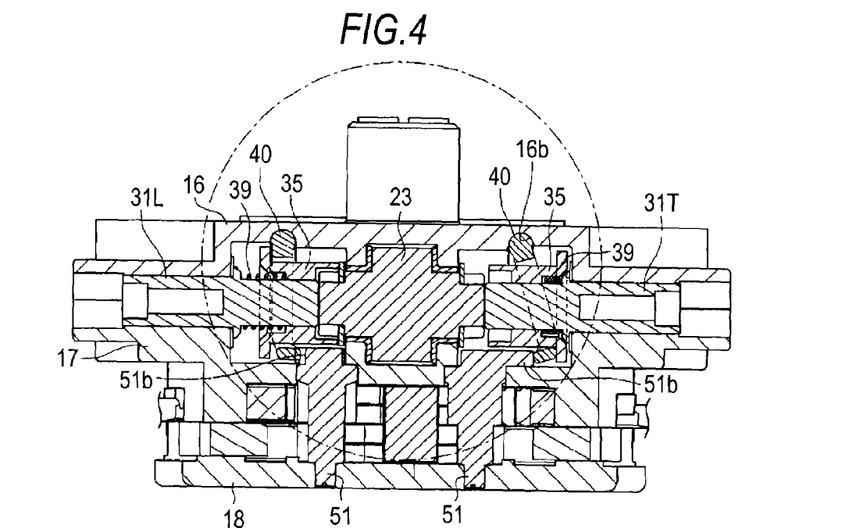
FIG. 4 is a cross-sectional view illustrating the same embodiment.

The tubular portion 36 of each tubular member 35 is loosely inserted into an intermediary member 40 which is supported by the main body case 16. In other words, as illustrated in FIGS. 4 and 5, a substantially semicircular groove-shaped bearing groove 16b extending in a vertical direction (a direction orthogonal to the drawing sheet) between the pressing piece 37 of the tubular member 35 and the worm wheel 23 (24) which are adjacent to each other is formed in the main body case 16.

Meanwhile, the intermediary member 40 includes a substantially superior arc columnar shaft portion 41 which is pivotally supported by the bearing groove 16b and includes a substantially square frame-shaped main body portion 42 crossing the tubular portion 36 of the tubular member 35 in a direction substantially orthogonal to the axial line direction. In the intermediary member 40, the tubular portion 36 is loosely inserted into a substantially circular insertion through hole 42a formed in the main body portion 42. Therefore, the intermediary member 40 can turn about the bearing groove 16b in a certain range without being hindered by the tubular portion 36. The circumferential direction of this turning range is along movement direction of the tubular member 35 coinciding with the axial line direction thereof.

Figure 5:
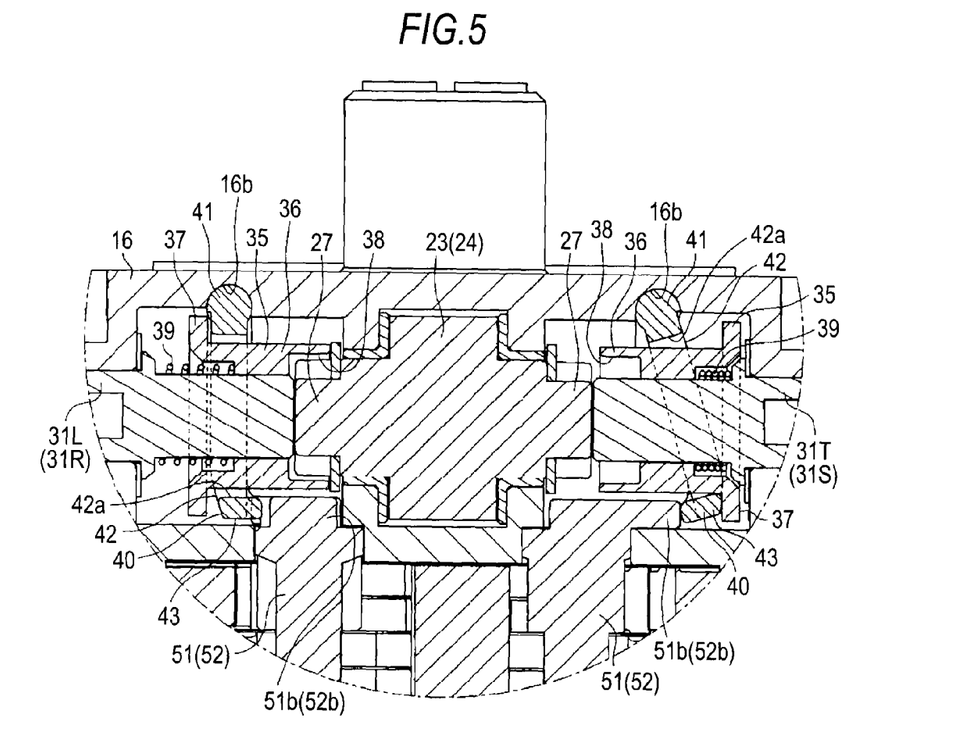
FIG. 5 is an enlarged view of FIG. 4.

As illustrated on the left side in FIG. 5, when the main body portion 42 of the intermediary member 40 is widened along the pressing piece 37 of the tubular member 35, that is, when the same is widened in a direction orthogonal to the axial line direction of the tubular member 35, the tubular member 35 is biased by the compression spring 39, thereby causing the fitting hole 38 to house the fitting portion 27 of the worm wheel 23 (24). Meanwhile, as illustrated on the right side in FIG. 5, when the main body portion 42 of the intermediary member 40 turns in a direction away from the worm wheel 23 (24) centering around the shaft portion 41, the tubular member 35 of the pressing piece 37 pressed by the main body portion 42 moves in the axial line direction against biasing force of the compression spring 39, thereby releasing the fitting hole 38 from the fitting portion 27 of the worm wheel 23 (24).

As illustrated in FIG. 8, a counterface of the main body portion 42 (the intermediary member 40) which can press the pressing piece 37 forms a curved surface 42b which is curved so as to be convex in the axial line direction approaching the pressing piece 37. It is needless to mention that the curved surface 42b is separately present in both the upper portion and the lower portion of the insertion through hole 42a. Moreover, the distal end portion 43 of the intermediary member 40 on a side being separated from the shaft portion 41 bulges in a substantially triangular shape in the circumferential direction being separated from the pressing piece 37 centering around the shaft portion 41 so as to cause a central portion thereof in the vertical direction to be the apex.

Figure 3:
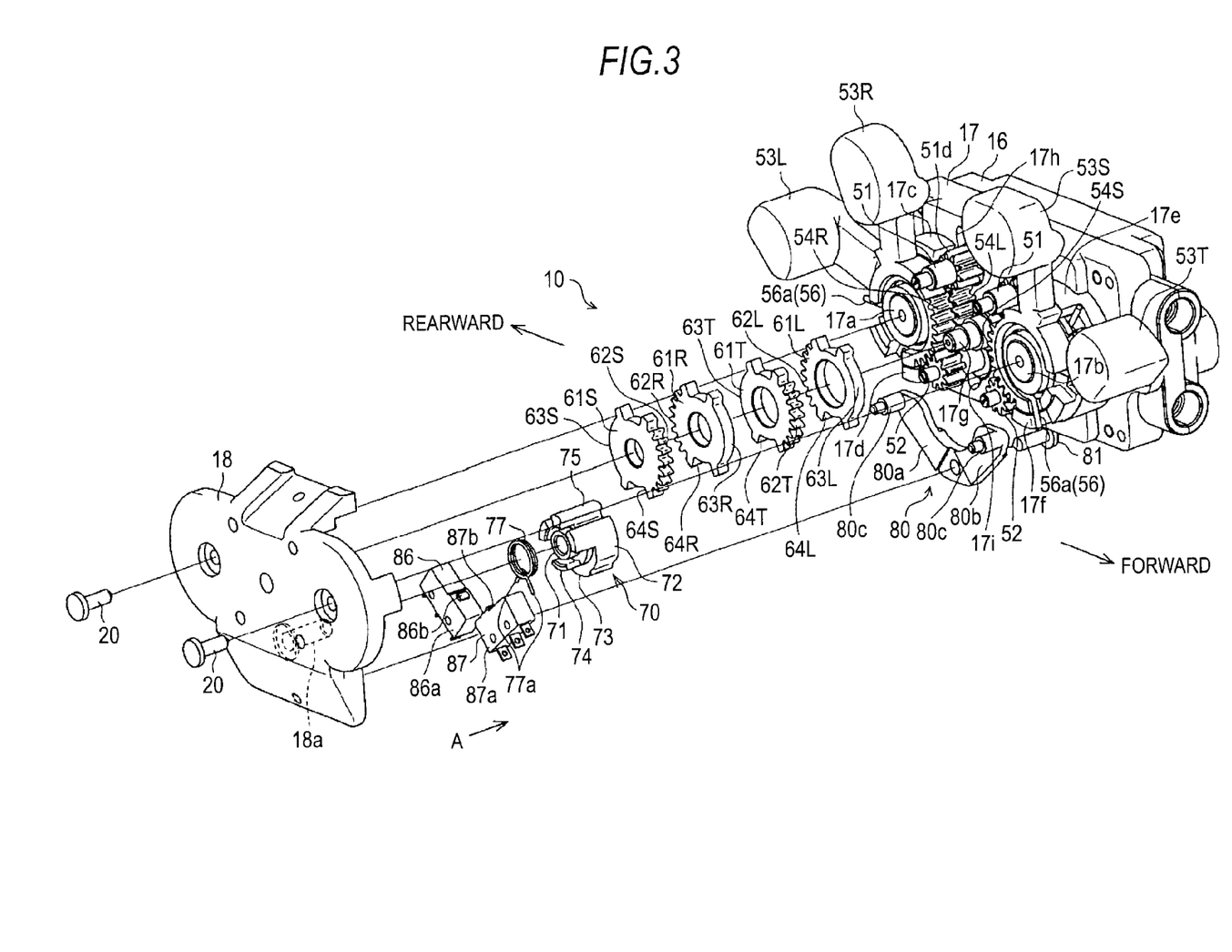
FIG. 3 is another exploded perspective view illustrating the same embodiment.
Figure 6A:
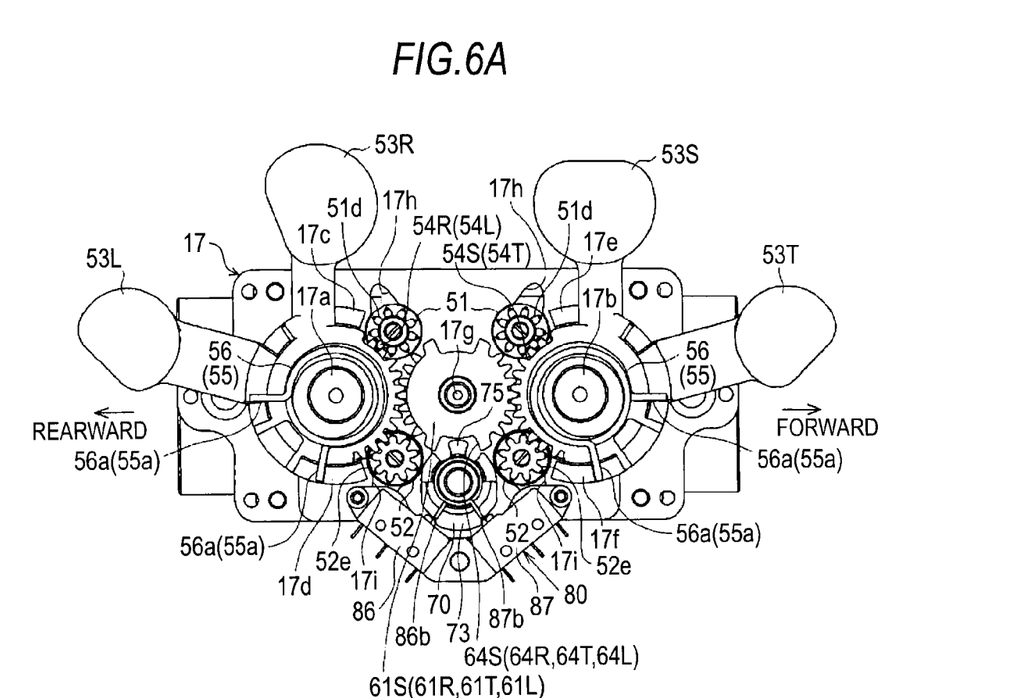
Figure 6B:
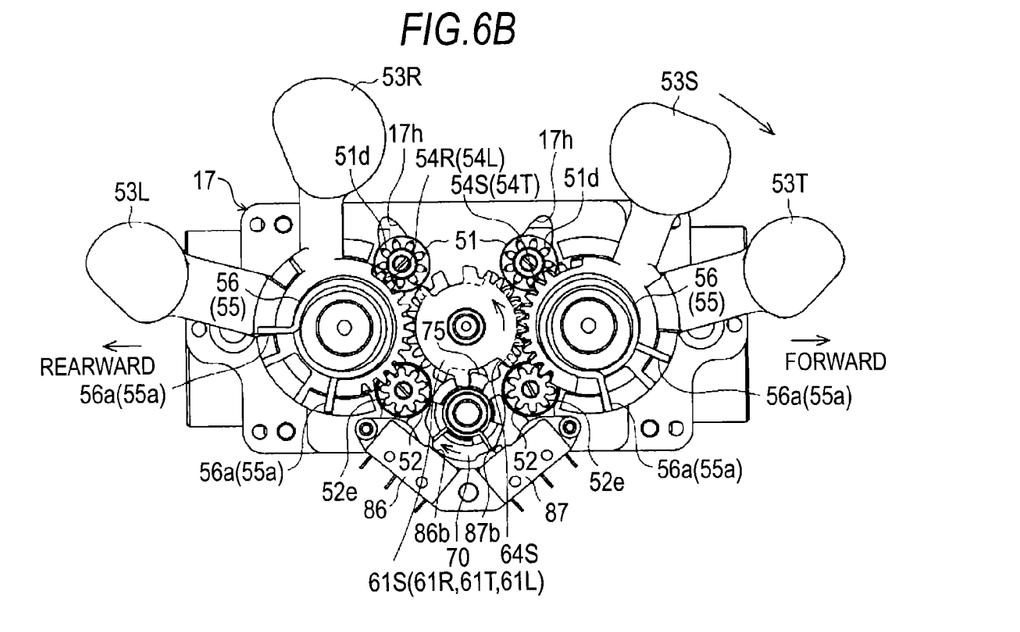

As illustrated in FIGS. 3, 6A, and 6B, a pair of support axis portions 17a and 17b arranged side by side in the front-back direction protrude in the main body case 17 toward the opposite side of the main body case 16 side by side in the axial line direction of the worm 22 (the rotary axis 11a). In the main body case 17, substantially arc columnar guide portions 17c and 17d protrude on the upper side and the lower side of the support axis portion 17a concentric therewith, and substantially arc columnar guide portions 17e and 17f protrude on the upper side and the lower side of the support axis portion 17b concentric therewith. In the main body case 17, a switch cam support axis portion 17g concentric with the worm 22 protrudes toward the opposite side of the main body case 16. The center of the switch cam support axis portion 17g is disposed in the center between the two support axis portions 17a and 17b.

In the main body case 17, substantially circular bearing holes 17h and 17i are respectively formed on the upper side and the lower side between the support axis portion 17a and the switch cam support axis portion 17g. The same bearing holes 17h and 17i are respectively formed on the upper side and the lower side between the support axis portion 17b and the switch cam support axis portion 17g. A pair of first cam members 51 are respectively and pivotally supported by the two bearing holes 17h on the upper side, and a pair of second cam members 52 are respectively and pivotally supported by the two bearing holes 17i on the lower side.

Figure 11A:
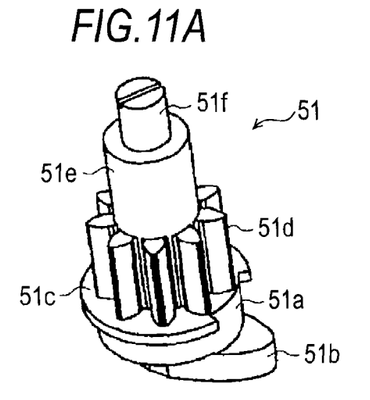
FIGS. 11A and 11B are perspective views illustrating a first cam member and a second cam member.

As illustrated in FIG. 11A, the first cam member 51 includes a substantially columnar large diameter shaft portion 51a which is pivotally supported by the bearing hole 17h, includes a substantially oval cam portion 51b which protrudes inside the main body case 17 from the bearing hole 17h, and includes a flange portion 51c which protrudes toward the outside of the main body case 17 from the bearing hole 17h and comes into sliding contact with an outer circumferential edge portion of the bearing hole 17h. The first cam member 51 includes a gear portion 51d which is adjacent to the flange portion 51c and is disposed outside the main body case 17, includes a columnar portion 51e which is adjacent to the gear portion 51d and is disposed farther outside the main body case 17, and includes a substantially columnar small diameter shaft portion 51f which is decreased in diameter more than that of the columnar portion 51e.

As illustrated in FIGS. 7 and 8, in the first cam member 51 on the lifter shaft 31L side, the cam portion 51b is disposed so as to cause the cam portion 51b to be able to come into contact with a distal end portion 43 of the intermediary member 40 on a side away from the shaft portion 41 and to come into contact with or to approach the outer circumferential surface of the tubular portion 36 of the tubular member 35. In other words, the first cam member 51 causes the cam portion 51b to press the pressing piece 37 of the tubular member 35 via the intermediary member 40. When a longitudinal direction of the cam portion 51b extends in a rotary position to coincide with the axial line direction of the tubular member 35 and the like, that is, the rotary position in which the tubular member 35 is caused to be farthest away from the worm wheel 23 (hereinafter, also referred to as "a neutral position" of the first cam member 51), the fitting hole 38 of the tubular member 35 is released from the fitting portion 27 of the worm wheel 23 against biasing force of the compression spring 39.

As illustrated on the left side in FIG. 5, when the longitudinal direction of the cam portion 51b is deviated from the axial line direction of the tubular member 35 and the like in response to the turning thereof, the first cam member 51 allows movement of the tubular member 35 so as to cause the fitting hole 38 of the tubular member 35 biased by the compression spring 39 to house the fitting portion 27 of the worm wheel 23. Meanwhile, the first cam member 51 presses the pressing piece 37 of the tubular member 35 with the cam portion 51b via the intermediary member 40 in response to the turning toward the neutral position, thereby moving the tubular member 35 against biasing force of the compression spring 39 and releasing the fitting hole 38 of the tubular member 35 from the fitting portion 27 of the worm wheel 23. The first cam member 51 on the tilt shaft 31T side is operated in the same manner.

Figure 11B:
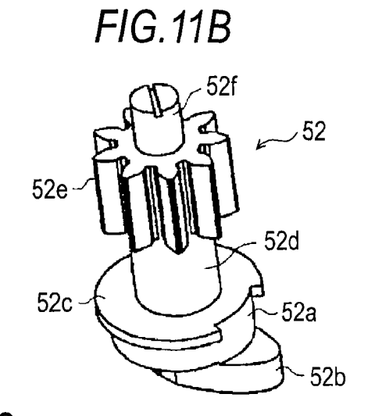

Meanwhile, as illustrated in FIG. 11B, the second cam member 52 includes a substantially columnar large diameter shaft portion 52a which is pivotally supported by the bearing hole 17i, includes a substantially oval cam portion 52b which protrudes inside the main body case 17 from the bearing hole 17i, and includes a flange portion 52c which protrudes toward the outside of the main body case 17 from the bearing hole 17i and comes into sliding contact with an outer circumferential edge portion of the bearing hole 17i. The second cam member 52 includes a columnar portion 52d which is adjacent to the flange portion 52c and is disposed outside the main body case 17, includes a gear portion 52e which is adjacent to the columnar portion 52d and is disposed farther outside the main body case 17, and includes a substantially columnar small diameter shaft portion 52f which is decreased in diameter more than that of the columnar portion 52d. In other words, the first and second cam members 51 and 52 mutually have the same shape except that the gear portions 51d and 52e and the columnar portions 51e and 52d are alternately disposed in the axial line direction.

In the second cam member 52 on the recliner shaft 31R side, the cam portion 52b is disposed so as to cause the cam portion 52b to be able to come into contact with the distal end portion 43 of the intermediary member 40 on a side away from the shaft portion 41 and to come into contact with or to approach the outer circumferential surface of the tubular portion 36 of the tubular member 35. In other words, the second cam member 52 causes the cam portion 52b to press the pressing piece 37 of the tubular member 35 via the intermediary member 40. When the longitudinal direction of the cam portion 52b extends in the rotary position to coincide with the axial line direction of the tubular member 35 and the like, that is, the rotary position in which the tubular member 35 is caused to be farthest away from the worm wheel 24 (hereinafter, also referred to as "a neutral position" of the second cam member 52), the fitting hole 38 of the tubular member 35 is released from the fitting portion 27 of the worm wheel 24 against biasing force of the compression spring 39.

When the longitudinal direction of the cam portion 52b is deviated from the axial line direction of the tubular member 35 and the like in response to the turning thereof, the second cam member 52 allows movement of the tubular member 35 so as to cause the fitting hole 38 of the tubular member 35 biased by the compression spring 39 to house the fitting portion 27 of the worm wheel 24. Meanwhile, the second cam member 52 presses the pressing piece 37 of the tubular member 35 with the cam portion 52b via the intermediary member 40 in response to the turning toward the neutral position, thereby moving the tubular member 35 against biasing force of the compression spring 39 and releasing the fitting hole 38 of the tubular member 35 from the fitting portion 27 of the worm wheel 24. The second cam member 52 on the slide shaft 31S side is operated in the same manner.

As illustrated in FIGS. 3, 6A, and 6B, a lifter operation handle 53L is pivotally supported by a base end portion of the support axis portion 17a. The lifter operation handle 53L meshes with the gear portion 51d of the first cam member 51 and includes a gear portion 54L idling at a position of the columnar portion 52d of the second cam member 52. Therefore, for example, when the lifter operation handle 53L is in turning operation, the first cam member 51 (the cam portion 51b) turns in accordance with rotational force transmitted from between the gear portions 54L and 51d. Accordingly, the tubular member 35 moves in the axial line direction in the above-described state.

A torsion spring 55 as the second biasing member is wound about the support axis portion 17a which is the inner circumferential side of the lifter operation handle 53L. The proximal end portions of hook portions 55a at both ends of the torsion spring 55 come into contact with a stopper portion of the lifter operation handle 53L so as to be wheel-locked, and the distal end portions of the hook portions 55a are positioned by the guide portions 17c and 17d. The lifter operation handle 53L is biased by the torsion spring 55, thereby being held in a predetermined initial position extending toward the rear of the support axis portion 17a. In this case, the first cam member 51 which integrally turns with the lifter operation handle 53L is set so as to be disposed at the neutral position. The biasing force of the torsion spring 55 holding the lifter operation handle 53L at the initial position is set to be greater than the biasing force of the compression spring 39 which moves the tubular member 35 so as to cause the fitting hole 38 of the tubular member 35 to house the fitting portion 27 of the worm wheel 23.

Therefore, normally, the lifter operation handle 53L is held at the initial position. In accordance therewith, the first cam member 51 is disposed at the neutral position. In other words, normally, the worm wheel 23 and the lifter shaft 31L are held in a state so as not to be able to transmit rotational force therebetween via the tubular member 35. When the lifter operation handle 53L is in turning operation against biasing force of the torsion spring 55, the first cam member 51 is deviated from the neutral position due to the turning of the first cam member 51 caused by the turning operation of the lifter operation handle 53L, and then, the tubular member 35 moves so as to cause the fitting hole 38 of the tubular member 35 to house the fitting portion 27 of the worm wheel 23 due to biasing force of the compression spring 39. Accordingly, rotational force of the worm wheel 23 can be transmitted to the lifter shaft 31L via the tubular member 35.

A recliner operation handle 53R is pivotally supported by the distal end portion of the support axis portion 17a. The recliner operation handle 53R meshes with the gear portion 52e of the second cam member 52 and includes a gear portion 54R idling at a position of the columnar portion 51e of the first cam member 51. Therefore, for example, when the recliner operation handle 53R is in turning operation, the second cam member 52 (the cam portion 52b) turns in accordance with rotational force transmitted from between the gear portions 54R and 52e. Accordingly, the tubular member 35 moves in the axial line direction in the above-described state.

A torsion spring 56 as the second biasing member is wound about the support axis portion 17a which is the inner circumferential side of the recliner operation handle 53R. The proximal end portions of hook portions 56a at both ends of the torsion spring 56 come into contact with a stopper portion of the recliner operation handle 53R so as to be wheel-locked, and the distal end portions of the hook portions 56a are positioned by the guide portions 17c and 17d. The recliner operation handle 53R is biased by the torsion spring 56, thereby being held in a predetermined initial position extending toward the upper portion of the support axis portion 17a. In this case, the second cam member 52 which integrally turns with the recliner operation handle 53R is set so as to be disposed at the neutral position. The biasing force of the torsion spring 56 holding the recliner operation handle 53R at the initial position is set to be greater than the biasing force of the compression spring 39 which moves the tubular member 35 so as to cause the fitting hole 38 of the tubular member 35 to house the fitting portion 27 of the worm wheel 24.

Therefore, normally, the recliner operation handle 53R is held at the initial position. In accordance therewith, the second cam member 52 is disposed at the neutral position. In other words, normally, the worm wheel 24 and the recliner shaft 31R are held in a state so as not to be able to transmit rotational force therebetween via the tubular member 35. When the recliner operation handle 53R is in turning operation against biasing force of the torsion spring 56, the second cam member 52 is deviated from the neutral position due to the turning of the second cam member 52 caused by the turning operation of the recliner operation handle 53R, and then, the tubular member 35 moves so as to cause the fitting hole 38 of the tubular member 35 to house the fitting portion 27 of the worm wheel 24 due to biasing force of the compression spring 39. Accordingly, rotational force of the worm wheel 24 can be transmitted to the recliner shaft 31R via the tubular member 35.

Meanwhile, a tilt operation handle 53T is pivotally supported by the base end portion of the support axis portion 17b. The tilt operation handle 53T meshes with the gear portion 51d of the first cam member 51 and includes a gear portion 54T idling at a position of the columnar portion 52d of the second cam member 52. The operation of the tilt operation handle 53T is the same as the operation of the lifter operation handle 53L. In other words, normally, the worm wheel 23 and the tilt shaft 31T are held in a state so as not to be able to transmit rotational force therebetween via the tubular member 35. When the tilt operation handle 53T is in turning operation against biasing force of the torsion spring 55, the first cam member 51 is deviated from the neutral position due to the turning of the first cam member 51 caused by the turning operation of the tilt operation handle 53T, and then, the tubular member 35 moves so as to cause the fitting hole 38 of the tubular member 35 to house the fitting portion 27 of the worm wheel 23 due to biasing force of the compression spring 39. Accordingly, rotational force of the worm wheel 23 can be transmitted to the tilt shaft 31T via the tubular member 35.

A slide operation handle 53S is pivotally supported by the distal end portion of the support axis portion 17b. The slide operation handle 53S meshes with the gear portion 52e of the second cam member 52 and includes a gear portion 54S idling at a position of the columnar portion 51e of the first cam member 51. The operation of the slide operation handle 53S is the same as the operation of the recliner operation handle 53R. In other words, normally, the worm wheel 24 and the slide shaft 31S are held in a state so as not to be able to transmit rotational force therebetween via the tubular member 35. When the slide operation handle 53S is in turning operation against biasing force of the torsion spring 56, the second cam member 52 is deviated from the neutral position due to the turning of the second cam member 52 caused by the turning operation of the slide operation handle 53S, and then, the tubular member 35 moves so as to cause the fitting hole 38 of the tubular member 35 to house the fitting portion 27 of the worm wheel 24 due to biasing force of the compression spring 39. Accordingly, rotational force of the worm wheel 24 can be transmitted to the slide shaft 31S via the tubular member 35.

As illustrated in FIG. 3, a lifter switch cam member 61L, a tilt switch cam member 61T, a recliner switch cam member 61R, and a slide switch cam member 61S having substantially annular shapes are pivotally supported by the switch cam support axis portion 17g, in order from the base end to the distal end.

The lifter switch cam member 61L is formed in the outer circumferential portion on a side facing the gear portion 54L of the lifter operation handle 53L, includes a gear portion 62L meshing therewith, and also includes an arc portion 63L formed in the outer circumferential portion on a side facing the gear portion 54T of the tilt operation handle 53T so as to be idling therein. Therefore, for example, when the lifter operation handle 53L is in turning operation, the lifter switch cam member 61L idles in the gear portion 54T of the tilt operation handle 53T in the arc portion 63L and turns in accordance with rotational force transmitted from between the gear portions 54L and 62L.

The tilt switch cam member 61T is formed in the outer circumferential portion on a side facing the gear portion 54T of the tilt operation handle 53T, includes a gear portion 62T meshing therewith, and also includes an arc portion 63T formed in the outer circumferential portion on a side facing the gear portion 54L of the lifter operation handle 53L so as to be idling therein. Therefore, for example, when the tilt operation handle 53T is in turning operation, the tilt switch cam member 61T idles in the gear portion 54L of the lifter operation handle 53L in the arc portion 63T and turns in accordance with rotational force transmitted from between the gear portions 54T and 62T.

The recliner switch cam member 61R is formed in the outer circumferential portion on a side facing the gear portion 54R of the recliner operation handle 53R, includes a gear portion 62R meshing therewith, and also includes an arc portion 63R formed in the outer circumferential portion on a side facing the gear portion 54S of the slide operation handle 53S so as to be idling therein. Therefore, for example, when the recliner operation handle 53R is in turning operation, the recliner switch cam member 61R idles in the gear portion 54S of the slide operation handle 53S in the arc portion 63R and turns in accordance with rotational force transmitted from between the gear portions 54R and 62R.

The slide switch cam member 61S is formed in the outer circumferential portion on a side facing the gear portion 54S of the slide operation handle 53S, includes a gear portion 62S meshing therewith, and also includes an arc portion 63S formed in the outer circumferential portion on a side facing the gear portion 54R of the recliner operation handle 53R so as to be idling therein. Therefore, for example, when the slide operation handle 53S is in turning operation, the slide switch cam member 61S idles in the gear portion 54R of the recliner operation handle 53R in the arc portion 63S and turns in accordance with rotational force transmitted from between the gear portions 54S and 62S.

The lifter switch cam member 61L, the tilt switch cam member 61T, the recliner switch cam member 61R, and the slide switch cam member 61S respectively form the switch cam portions 64L, 64T, 64R, and 64S at the lower portion of the outer circumferential portion interposed between the gear portions 62L, 62T, 62R, and 62S and the arc portions 63L, 63T, 63R, and 63S.

As illustrated in FIG. 3, the driving apparatus 10 includes a cover 18 forming a casing thereof, in addition to the main body cases 16 and 17. The cover 18 is fastened to the main body case 17 as two screws 20 penetrating parallel to the axial line direction of the rotary axis 11a are respectively fastened to the two support axis portions 17a and 17b in a state of covering the main body case 17 from outside. Accordingly, the operation handles 53L, 53T, 53R, and 53S are positioned in the axial line direction. In this case, as the distal end of the switch cam support axis portion 17g fits the cover 18, the switch cam members 61L, 61T, 61R, and 61S are positioned in the axial line direction. Moreover, each of the first cam member 51 and the second cam member 52 is positioned in the axial line direction as the small diameter shaft portions 51f and 52f are pivotally supported by the cover 18.

A switch support axis portion 18a including the axial line extending on the lower side of the switch cam support axis portion 17g to be in parallel to the axial line thereof protrudes from the cover 18. A switch lever 70 disposed at the lower side of the switch cam portions 64L, 64T, 64R, and 64S is supported by the switch support axis portion 18a. The switch lever 70 exhibits a bilaterally symmetrical shape, includes a substantially cylindrical bearing portion 71 which is pivotally supported by the switch support axis portion 18a, and includes a flange 72 extending outward from the end portion on a side away from the cover 18 of the bearing portion 71. A substantially fan-shaped columnar switch pressing portion 73 protruding downward is formed in the flange 72. In the lower end portion of the flange 72, a substantially arc columnar stopper piece 74 protrudes toward the cover 18 above the switch pressing portion 73 in parallel to the bearing portion 71. Moreover, the switch lever 70 includes a substantially square columnar pressed portion 75 which is connected to the flange 72 at an angle position at the upper end. The pressed portion 75 is positioned on a farther outer circumferential side than the bearing portion 71, and the length thereof in the axial line direction is set to be equivalent to the length of all of the switch cam members 61L, 61T, 61R, and 61S in the axial line direction in a state of being superposed. In other words, the pressed portion 75 extends along the direction so as to cover the positions of all of the switch cam members 61L, 61T, 61R, and 61S in the axial line direction.

A return spring 77 configured to be a torsion spring, for example, is wound about the bearing portion 71 which is on a farther inner circumferential side than the stopper piece 74 and the like. The proximal end portions of the hook portions 77a at both ends of the return spring 77 come into contact with the stopper piece 74 so as to be wheel-locked, and the distal end portions of the hook portions 77a are positioned at an engagement wall (not illustrated) of the cover 18. As the switch lever 70 is biased by the return spring 77, the pressed portion 75 is held at a predetermined initial turning position (the neutral position) extending upward.

Here, as illustrated in FIG. 6A, it is considered that all of the operation handles 53L, 53T, 53R, and 53S are not in operation and are disposed at a corresponding predetermined initial position. In this case, the pressed portion 75 of the switch lever 70 disposed at the initial turning position is disposed so as to block the turning track about the switch cam support axis portion 17g of the switch cam portions 64L, 64T, 64R, and 64S of all of the switch cam members 61L, 61T, 61R, and 61S.

As illustrated in the changes shifted to that in FIG. 6B, if the slide switch cam member 61S (a switch cam portion 64S) is caused to turn counterclockwise by performing a clockwise turning operation of the slide operation handle 53S, for example, the slide switch cam member 61S presses the pressed portion 75 of the switch lever 70 with the switch cam portion 64S. Accordingly, the switch lever 70 turns clockwise as illustrated centering around the switch support axis portion 18a.

In contrast, when the slide switch cam member 61S (the switch cam portion 64S) is caused to turn clockwise as illustrated in FIG. 6A by performing a counterclockwise turning operation of the slide operation handle 53S, the slide switch cam member 61S presses the pressed portion 75 of the switch lever 70 with the switch cam portion 64S. Accordingly, the switch lever 70 turns counterclockwise as illustrated centering around the switch support axis portion 18a.

As illustrated in FIGS. 3, 6A, and 6B, a support frame 80 is disposed below the switch lever 70. The support frame 80 includes a pair of support pieces 80a and 80b opposing each other upwards from the lower end portion and being oriented in the front-back direction, and exhibits a substantially V-shape. In the upper end portion of each of the support pieces 80a and 80b, a joining protrusion portion 80c protrudes toward the cover 18 in parallel to the axial line direction of the support axis portions 17a and 17b and the like. The support frame 80 is supported by the cover 18 as a screw 81 penetrating the lower end portion in parallel to the axial line direction of the joining protrusion portion 80c and the like is fastened to the cover 18, and the distal ends of the two joining protrusion portions 80c are fitted to the cover 18.

The two support pieces 80a and 80b respectively support the first switch structure body 86 and the second switch structure body 87 below the joining protrusion portion 80c. Each of the first switch structure body 86 and the second switch structure body 87 includes substantially rectangular column-shaped main body portions 86a and 87a extending in an extension direction of the two support pieces 80a and 80b, and includes buttons 86b and 87b which can be upwardly in and out from the top surface in which the main body portions 86a and 87a face each other. The buttons 86b and 87b are normally in a state of respectively protruding upwards from the top surfaces of the main body portions 86a and 87a, and are disposed so as to block the turning track centering around the switch support axis portion 18a of the switch pressing portion 73. Therefore, as illustrated in the change shifted to that in FIG. 6B, for example, when the switch lever 70 turns clockwise centering around the switch support axis portion 18a, in accordance therewith, a button 86b of the first switch structure body 86 is pressed downward by the switch pressing portion 73. In contrast, when the switch lever 70 turns counterclockwise centering around the switch support axis portion 18a as in FIG. 6A, in accordance therewith, a button 87b of the second switch structure body 87 is pressed downward by the switch pressing portion 73.

Figure 12:
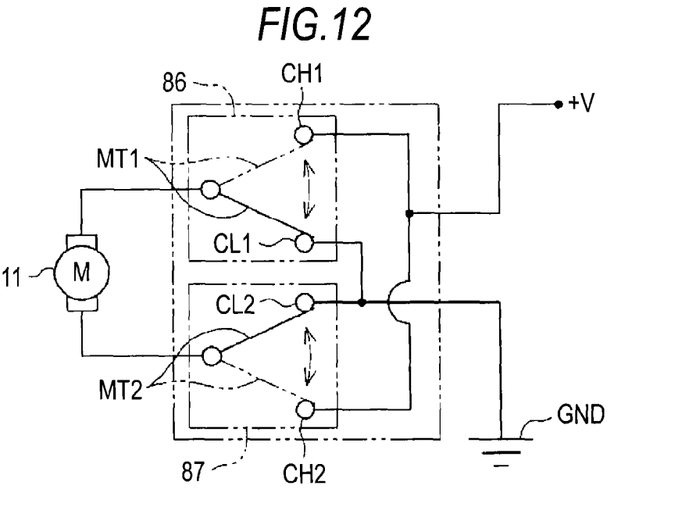
FIG. 12 is an equivalent circuit schematic illustrating an electrical configuration of the same embodiment.

As illustrated in FIG. 12, each of the first switch structure body 86 and the second switch structure body 87 includes an electric circuit which is configured to have contact points CH1 and CH2 electrically connected to a high potential +V of a DC power source, contact points CL1 and CL2 electrically connected to a low potential GND, and movable terminals MT1 and MT2 connected to terminals of the rotary motor 11 different from each other. The two movable terminals MT1 and MT2 are respectively coupled to the two buttons 86b and 87b and are electrically connected to the contact points CL1 and CL2 on the low potential GND side, normally. The two movable terminals MT1 and MT2 are electrically connected to the contact points CH1 and CH2 on the high potential +V side as the two buttons 86b and 87b are respectively pressed down. Therefore, when the switch lever 70 turns clockwise centering around the switch support axis portion 18a in accordance with a turning operation of any one of the operation handles 53L, 53T, 53R, and 53S, the movable terminal MT1 of the first switch structure body 86 of which the button 86b is pressed down is electrically connected to the contact point CH1 on the high potential +V side, thereby electrifying the rotary motor 11 through one polarity. In contrast, when the switch lever 70 turns counterclockwise centering around the switch support axis portion 18a, the movable terminal MT2 of the second switch structure body 87 of which the button 87b is pressed down is electrically connected to the contact point CH2 on the high potential +V side, thereby electrifying the rotary motor 11 through the opposite polarity.

Subsequently, the operation of the embodiment will be described. Each of the lifter operation handle 53L, the tilt operation handle 53T, the recliner operation handle 53R, and the slide operation handle 53S is substantially the same with each other except rotational force transmitted to the shafts 31L, 31T, 31R, and 31S related to the turning operation. Therefore, an operation of the lifter operation handle 53L will be described below as being representative.

Firstly, it is considered that the lifter operation handle 53L is not in operation, thereby being in a state where rotational force of the worm wheel 23 cannot be transmitted to the lifter shaft 31L, and connection between the rotary motor 11 and the DC power source is blocked via the first and second switch structure bodies 86 and 87. In this state, when the lifter operation handle 53L is in a turning operation clockwise or counterclockwise against biasing force of the torsion spring 55, the first cam member 51 turns in response to the rotational force transmitted through the gear portions 54L and 51d. Accordingly, the first cam member 51 is deviated from the neutral position, and the tubular member 35 moves so as to cause the fitting hole 38 of the tubular member 35 to house the fitting portion 27 of the worm wheel 23 by biasing force of the compression spring 39. Then, rotational force of the worm wheel 23 can be transmitted to the lifter shaft 31L via the tubular member 35.

Meanwhile, when the lifter operation handle 53L is in a turning operation clockwise or counterclockwise, in response to the rotational force transmitted through the gear portions 54L and 62L, the lifter switch cam member 61L turns counterclockwise or clockwise coping with the operation direction of the lifter operation handle 53L. In this case, the switch lever 70 is pressed by the switch cam portion 64L coping with the rotational direction of the lifter switch cam member 61L, thereby turning clockwise or counterclockwise about the switch support axis portion 18a. Then, as the switch lever 70 turns about the switch support axis portion 18a, the corresponding button between the buttons 86b and 87b is pressed by the switch pressing portion 73. Accordingly, the rotary motor 11 and the DC power source are connected to each other through the polarity coping with the pressed button between the buttons 86b and 87b (the movable terminals MT1 and MT2), and thus, the rotary motor 11 rotates normally or reversely. In other words, a button to be pressed is determined between the buttons 86b and 87b by the operation direction of the lifter operation handle 53L, thereby determining the rotational direction of the rotary motor 11.

As the rotary motor 11 rotates, the rotational force thereof is transmitted to the lifter shaft 31L via the input torque cable 12, the worm 22, the worm wheel 23, and the tubular member 35. Then, in response to the rotational force of the lifter shaft 31L, the lifter mechanism M1 is activated so as to lift and lower the seat 6 coping with the rotational direction.

Thereafter, when operating force of the lifter operation handle 53L is cancelled, the lifter operation handle 53L is biased by the torsion spring 55 and returns to the initial position. Accordingly, the first cam member 51 turns in response to the rotational force transmitted through the gear portions 54L and 51d against biasing force of the compression spring 39, and thus, the first cam member 51 returns to the neutral position. The biasing force of the torsion spring 55 which causes the lifter operation handle 53L to return to the initial position together with the first cam member 51 is greater than the biasing force of the compression spring 39 which moves the tubular member 35, as described above. Accordingly, rotational force of the worm wheel 23 cannot be transmitted to the lifter shaft 31L via the tubular member 35.

Meanwhile, in accordance with returning of the lifter operation handle 53L to the initial position, the lifter switch cam member 61L turns in response to the rotational force transmitted through the gear portions 54L and 62L, and the switch lever 70 returns to the initial turning position together with the corresponding buttons 86b and 87b, thereby blocking the connection between the rotary motor 11 and the power source. Accordingly, the rotary motor 11 stops rotating.

Other operation handles 53T, 53R, and 53S are operated in the same manner.

Incidentally, as described above, in the main body portion 42 of the intermediary member 40, the curved surface 42b is molded so as to be convex in the axial line direction approaching the pressing piece 37 of the tubular member 35. The curved surface 42b is formed so as to cause the pressing portion of the pressing piece 37 pressed by the main body portion 42 to be separated from the axial line (the shaft portion 41) in accordance with the first cam member 51 turning toward the neutral position.

Figure 9A:
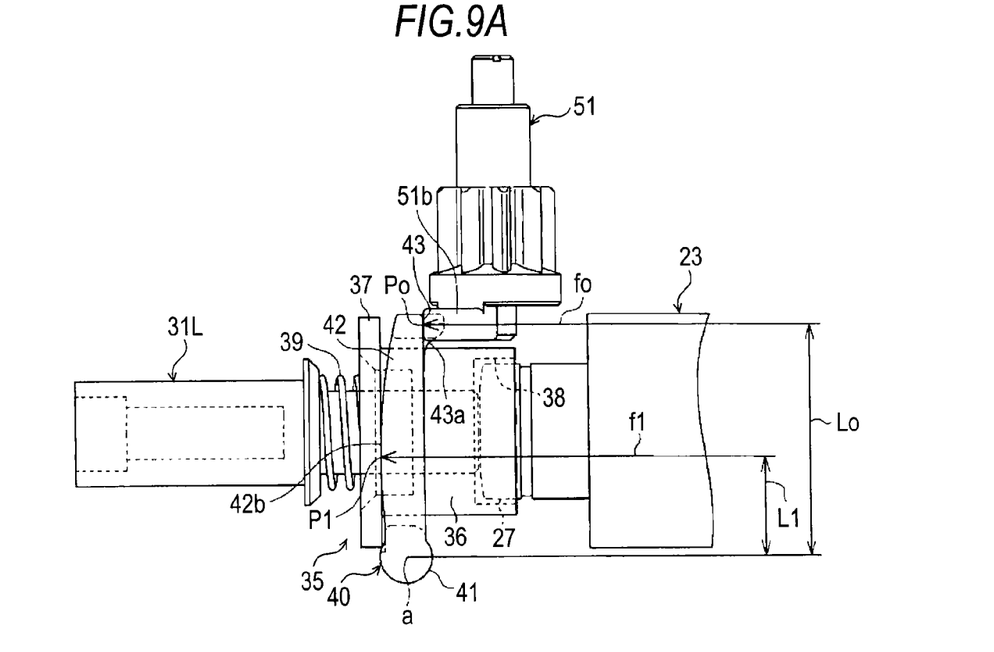
FIGS. 9A and 9B are plan views illustrating operations of the same embodiment.

Therefore, as illustrated in FIG. 9A, in a state where the worm wheel 23 is fitted into the tubular member 35, and the intermediary member 40 (the main body portion 42) is provided to be parallel to the pressing piece 37, the intermediary member 40 is set so as to come into contact with the pressing piece 37 at a position P1 (the pressing portion) relatively approaching the shaft portion 41 (a fulcrum a), by the curved surface 42b. In other words, the position P1 is disposed in the vicinity of the axial line of the tubular member 35.

A position at which the cam portion 51b of the first cam member 51 comes into contact with the distal end portion 43 of the intermediary member 40 is expressed as a position Po (the pressed portion), a separation distance (a length of an arm) with respect to the fulcrum a having the position Po as leverage is expressed as a distance Lo, pressing force (load) of the intermediary member 40 applied by the first cam member 51 (the cam portion 51b) is expressed as fo, and a separation distance (a length of the arm) with respect to the fulcrum a having the position P1 as a point of action is expressed as a distance L1 (<Lo). In this case, releasing force (load) f1 at the time of releasing the tubular member 35 from the worm wheel 23 in a state of being fitted therein is calculated as follows on the basis of the principle of "leverage".

$$f1 \times L1 = fo \times Lo$$

$$f1 = fo \times Lo/L1$$

Since the distance Lo is greater than the distance L1 such that (Lo/L1>1), it is confirmed that the releasing force f1 increases with respect to the pressing force fo.

Figure 9B:
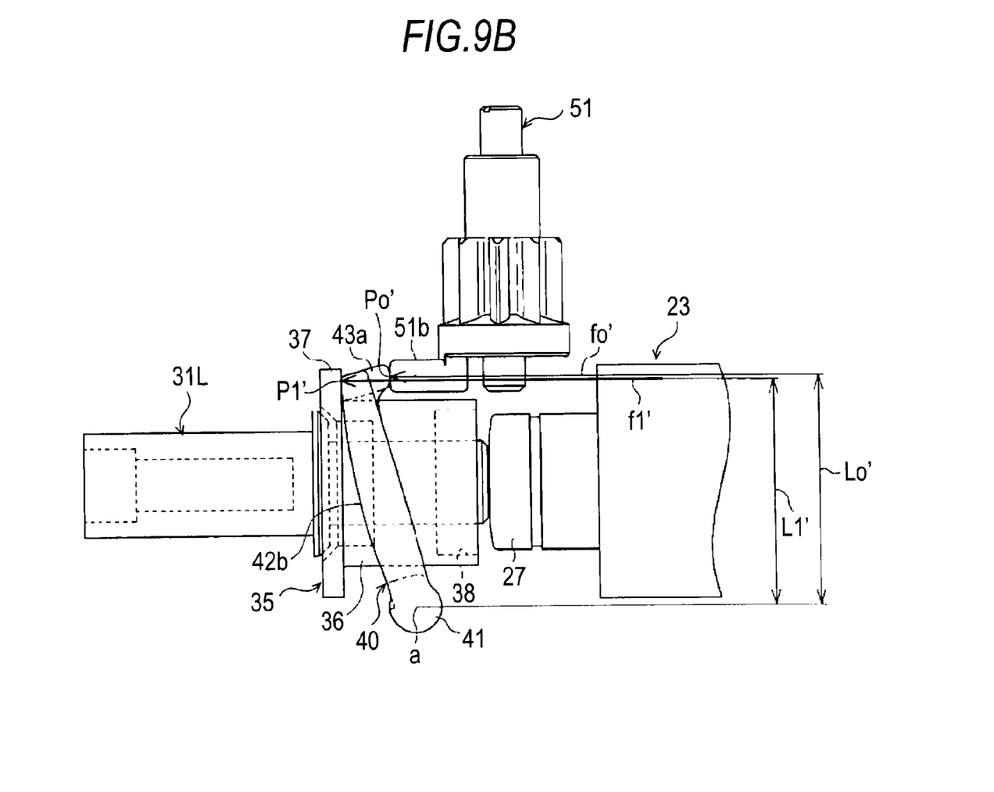

Meanwhile, as illustrated in FIG. 9B, in a state where the first cam member 51 reaches the neutral position, and the fitted worm wheel 23 is released from the tubular member 35, the intermediary member 40 is set so as to come into contact with the pressing piece 37 at a position P1' (the pressing portion) being relatively separated from the shaft portion 41 (the fulcrum a), by the curved surface 42b.

A position at which the cam portion 51b of the first cam member 51 comes into contact with the distal end portion 43 of the intermediary member 40 is expressed as a position Po' (the pressed portion), a separation distance (a length of an arm) with respect to the fulcrum a having the position Po' as leverage is expressed as a distance Lo', pressing force of the intermediary member 40 applied by the first cam member 51 is expressed as fo', and a separation distance with respect to the fulcrum a having the position P1' as a point of action is expressed as a distance L1' ($\cong$Lo'). In this case, releasing force f1' in a state where the fitted worm wheel 23 is released from the tubular member 35 is calculated in a similar manner as follows.

$$f1' = fo' \times Lo'/L1'$$

Even though the distance Lo is slightly greater than the distance L1, since the distance Lo and the distance L1 are approximately the same (Lo/L1$\cong$1) with each other, it is confirmed that the releasing force f1 is approximately the same with the pressing force fo of which the increase with respect to pressing force fo is insignificant. However, in this case, since an amount of movement in the axial line direction for being separated from the worm wheel 23 of the tubular member 35 coincides with an amount of movement in the same direction of the distal end portion 43 about the shaft portion 41, the movement speed of the tubular member 35 increases.

Figure 10:
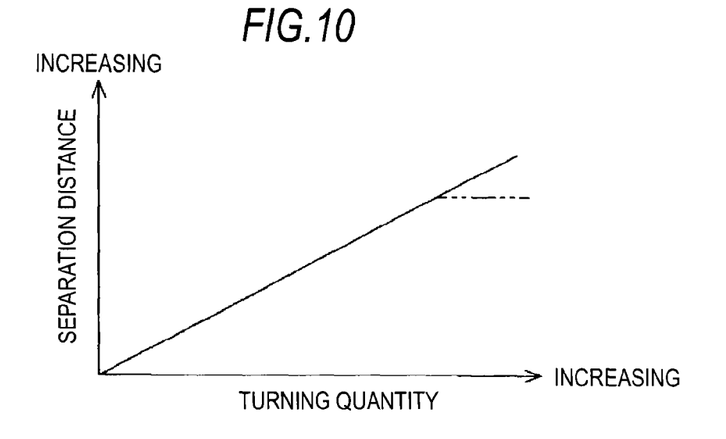
FIG. 10 is a graph illustrating a relationship between the turning quantity of an intermediary member and a separation distance between a pressing portion and a shaft portion.

FIG. 10 is a graph illustrating a relationship between the turning quantity having the turning position of the intermediary member 40 in FIG. 9A as the origin point, and a separation distance from the shaft portion 41 (the fulcrum a) of the pressing portion of the pressing piece 37 pressed by the intermediary member 40 (the curved surface 42b). As illustrated in the same diagram, in the embodiment, when turning the intermediary member 40 by the curved surface 42b so as to release the fitted worm wheel 23 from the tubular member 35, the separation distance is set so as to gradually increase in accordance with the increase of the turning quantity thereof. In other words, when the first cam member 51 starts to turn toward the neutral position, releasing force increases with respect to the pressing force of the intermediary member 40 applied by the first cam member 51. Accordingly, even though the releasing force gradually decreases as the fitted worm wheel 23 is released from the tubular member 35, the movement speed of the tubular member 35 gradually increases.

As described above, the distal end portion 43 of the intermediary member 40 bulges in a substantially triangular shape so as to cause the central portion thereof in the vertical direction to be the apex. Accordingly, as illustrated in FIGS. 9A and 9B, the counterface of the distal end portion 43 (the intermediary member 40) which can be pressed by the first cam member 51 includes a protrusion surface 43a from which the pressed portion pressed by the first cam member 51 protrudes toward the first cam member 51 in the circumferential direction centering around the axial line of the intermediary member 40 in accordance with the first cam member 51 turning toward the neutral position. Therefore, as the first cam member 51 approaches the neutral position, the pressed portion of the intermediary member 40 pressed by the first cam member 51 protrudes toward the first cam member 51 in the circumferential direction centering around the axial line thereof due to the protrusion surface 43a, and thus, the turning quantity of the intermediary member 40 is increased as much as thereof. Accordingly, an amount of movement in the axial line direction of the tubular member 35 which is pressed in response to the turning of the intermediary member 40 is increased.

It is the same in the intermediary member 40 between the worm wheel 23 and the tilt shaft 31T, between the worm wheel 24 and the recliner shaft 31R, and between the worm wheel 24 and the slide shaft 31S.

As described above in detail, according to the embodiment, the following effects can be achieved.

(1) In the embodiment, when the first cam member 51 (the second cam member 52) starts to turn toward the neutral position in a state where the worm wheel 23 (24) is fitted into the tubular member 35, it is possible to increase releasing force for releasing the fitted worm wheel 23 (24) from the tubular member 35 on the basis of "the principle of leverage" as the pressing portion approaches the axial line (the shaft portion 41) of the intermediary member 40 by the curved surface 42b while the intermediary member 40 presses the pressing piece 37. Therefore, for example, even though the tubular member 35 and the worm wheel 23 (24) mesh with each other when being integrally rotated, the fitted worm wheel 23 (24) can be more reliably released from the tubular member 35. Meanwhile, if the first cam member 51 (the second cam member 52) approaches the neutral position, the pressing portion is separated from the axial line (the shaft portion 41) of the intermediary member 40 by the curved surface 42b while the intermediary member 40 presses the pressing piece 37, it is possible to increase a movement speed of the tubular member 35 at the time of releasing the fitted worm wheel 23 (24) from the tubular member 35.

(2) In the embodiment, the intermediary member 40 is provided to be parallel to the pressing piece 37 when seen therefrom in the axial line direction in a state where the worm wheel 23 (24) is fitted into the tubular member 35. Therefore, when the first cam member 51 (the second cam member 52) starts to turn toward the neutral position, the tubular member 35 moves in the axial line direction thereof as far as a distance equivalent to an amount of movement in the circumferential direction centering around the axial line (the shaft portion 41) of the intermediary member 40 in the pressing portion of the pressing piece 37 caused due to the turning of the intermediary member 40. Therefore, in response to the turning of the intermediary member 40, it is possible to move the tubular member 35 more efficiently in the axial line direction thereof.

(3) In the embodiment, as the first cam member 51 (the second cam member 52) approaches the neutral position, the pressed portion of the intermediary member 40 pressed thereby protrudes toward the first cam member 51 (the second cam member 52) in the circumferential direction centering around the axial line thereof due to the protrusion surface 43a, and thus, the turning quantity of the intermediary member 40 increases as much as thereof. Accordingly, it is possible to increase an amount of movement in the axial line direction of the tubular member 35 which is pressed in response to the turning of the intermediary member 40. Moreover, without causing the cam portion 51b (52b) to be unnecessarily elongated, the tubular member 35 can be sufficiently moved in the axial line direction thereof.

(4) In the embodiment, in the fitting portion 27 (the arc columnar shape 29) of the worm wheel 23 or 24, a gradual change portion 29a of which play between the fitting hole 38 and the fitting portion 27 increases in response to movement in the axial line direction in which the worm wheel 23 or 24 and the tubular member 35 are separated from each other is formed. Therefore, for example, even though the tubular member 35 and the worm wheel 23 or 24 mesh with each other when being integrally rotated, if the worm wheel 23 or 24 and the tubular member 35 move slightly in the axial line direction so as to be separated from each other, the meshing state can be relaxed as much as the increased amount of play thereof. Thus, it is possible to smoothly release the fitted worm wheel 23 or 24 from the tubular member 35.

(5) In the embodiment, when the first cam member 51 (the second cam member 52) starts to turn toward the neutral position in a state where the worm wheel 23 or 24 is fitted into the tubular member 35, the pressing portion is disposed in the vicinity of the axial line of the tubular member 35 by the curved surface 42b while the intermediary member 40 presses the pressing piece 37. Therefore, a load applied to the tubular member 35 is close to the axial line thereof. Therefore, deviation of the tubular member 35 (misalignment of the axial line) can be prevented, and thus, it is possible to smoothly release the fitted worm wheel 23 or 24 from the tubular member 35.

(6) In the embodiment, since there is no need to unnecessarily increase the biasing force of the torsion springs 55 and 56 for holding (restoring) the first and second cam members 51 and 52 at the neutral position, it is possible to prevent an increase in operation force required when causing the operation handles 53L, 53T, 53R, and 53S to turn from the initial position.

(7) In the embodiment, the plurality of positional adjustment mechanisms (M1 to M4) can be selectively activated with one rotary motor 11, and the electrical configuration thereof can be simplified further. In addition, each of the plurality of tubular members 35 and the like (the clutch mechanisms) has a configuration (so-called shaft coupling) in which the output shaft (the lifter shaft 31L, the tilt shaft 31T, the recliner shaft 31R, and the slide shaft 31S) leading to the corresponding positional adjustment mechanism (M1 to M4) is connected to the worm wheels 23 and 24. Therefore, each of the plurality of tubular members 35 and the like (the clutch mechanisms) can be intensively disposed about the output shaft and the like, and thus, it is possible to decrease the apparatus further in size in the entirety thereof. Moreover, since the number of functions (the number of the positional adjustment mechanisms) regarding a positional adjustment of a seat can be as many increased as the number of the output shafts (four), it is possible to relax the constraints on the number of functions.

(8) In the embodiment, as the operation handles 53L, 53T, 53R, and 53S are caused to be in turning operations from the initial position, the rotary motor 11 can be electrified through the polarity coping with the operation direction by the first and second switch structure bodies 86 and 87 while connecting the corresponding clutch mechanism. Therefore, it is possible to rotate the rotary motor 11 normally or reversely in accordance with the operation direction of the operation handles 53L, 53T, 53R, and 53S. Thus, it is possible to set the operation direction of the operation handles 53L, 53T, 53R, and 53S and the adjustment direction of the positional adjustment mechanism (M1 to M4) so as to have a relationship easier to be grasped.

The embodiment can be changed as follows.

As indicated by the two-dot chained line in FIG. 10, in the end stage in which the first cam member 51 (the second cam member 52) approaches the neutral position, the curved surface may have a uniform separation distance from the axial line (the shaft portion 41) of the pressing portion with which the intermediary member 40 presses the pressing piece 37, that is, the curved surface may satisfy a relationship of monotonous non-decreasing in which the separation distance does not decrease at least. In other words, the expression "causing the pressing portion of the pressing piece to be separated from the axial line of the intermediary member in accordance with the cam member turning toward the neutral position" also includes a transition in which there is at least no approach.

In the embodiment, in place of the worm 22 and the worm wheels 23 and 24, the helical gears which mesh with each other may be employed. In this case, rotation may be transmitted by performing speed reduction between the two helical gears, or may be transmitted at the equivalent speed.

In the embodiment, in place of the gradual change portion 29a which is formed in the fitting portion 27 (the arc columnar shape 29) of the worm wheel 23 or 24, or in addition to the gradual change portion 29a, the same gradual change portion may be formed in the arc hole 38b of the tubular member 35. Otherwise, the gradual change portion 29a formed in the fitting portion 27 (the arc columnar shape 29) of the worm wheel 23 or 24 may be omitted.

In the embodiment, the fitting portion (27) of the worm wheel 23 or 24 may have a two-vane shape, a polygonal columnar shape, or an elliptical columnar shape. In other words, it is acceptable as long as the fitting portion and the fitting hole which can fit each other are combined so as to cause the worm wheel 23 or 24 and the tubular member 35 to be integrally rotatable. In all cases, it is preferable to form the gradual change portion of which play between the fitting portion and the fitting hole is increased in accordance with movement in the axial line direction in which the worm wheel 23 or 24 and the tubular member 35 are separated from each other, in at least one of the fitting portion and the fitting hole.

In the embodiment, the protrusion surface 43a of the distal end portion 43 of the intermediary member 40 may be omitted.

In the embodiment, in a state where the worm wheel 23 or 24 is fitted into the tubular member 35 (refer to FIG. 9A), the intermediary member 40 may be widened in a tilted state with respect to the pressing piece 37.

In the embodiment, any one of the worm wheels 23 and 24 may be spared so as to provide a two-system output (that is, two positional adjustment mechanisms). Otherwise, an output which can be connected to the worm wheel 23 or 24 as one system may be employed.

Subsequently, technological idea that can be grasped from the above-described embodiments and other examples will be additionally described.

(A) The seat driving apparatus includes the operation member which is provided so as to correspond to the positional adjustment mechanism and is joined to the cam member so as to be driven therewith. The second biasing member holds the cam member at the neutral position by biasing the operation member so as to be held at the initial position.

An aspect of this disclosure is directed to a seat driving apparatus including a tubular member into which an output shaft leading to a positional adjustment mechanism is fitted, in which the output shaft integrally rotate therewith and is relatively movable in an axial line direction, into which an input shaft is fitted, in which integrally rotate therewith in response to movement in the axial line direction toward the input shaft rotationally driven by a rotary motor, and which includes a tubular portion and a pressing piece protruding outwardly from the tubular portion, a first biasing member that biases the tubular member in the axial line direction toward the input shaft, an intermediary member into which the tubular portion is loosely inserted and which is turnable about an axial line extending in a direction different from a direction of an axial line of the tubular member; a cam member that is supported turnably around an axial line extending in a direction different from the directions of the axial line of the tubular member and the axial line of the intermediary member, presses the pressing piece via the intermediary member so as to release the fitted input shaft from the tubular member against biasing force of the first biasing member by pressing a distal end portion of the intermediary member being separated from the axial line of the intermediary member when being at a neutral position, and allows the input shaft to fit into the tubular member biased by the first biasing member in response to turning force from the neutral position; and a second biasing member that biases the cam member so as to be held at the neutral position. A counterface of the intermediary member pressing the pressing piece includes a curved surface causing a pressing portion with which the pressing piece presses the intermediary member, to be separated from the axial line of the intermediary member in accordance with the cam member turning toward the neutral position.

With this configuration, when the cam member starts to turn toward the neutral position in a state where the input shaft is fitted into the tubular member, it is possible to increase releasing force for releasing the fitted input shaft from the tubular member as the pressing portion approaches the axial line of the intermediary member by the curved surface while the intermediary member presses the pressing piece. Therefore, for example, even though the tubular member and the input shaft mesh with each other when being integrally rotated, the fitted input shaft can be more reliably released from the tubular member. Meanwhile, if the cam member approaches the neutral position, the pressing portion is separated from the axial line of the intermediary member by the curved surface while the intermediary member presses the pressing piece, it is possible to increase a movement speed of the tubular member at the time of releasing the fitted input shaft from the tubular member.

In the seat driving apparatus according to the aspect of this disclosure, it is preferable that the intermediary member is provided to be parallel to the pressing piece when seen from the intermediary member in the axial line direction in a state where the input shaft is fitted into the tubular member.

With this configuration, when the cam member starts to turn toward the neutral position, the tubular member moves in the axial line direction thereof as far as a distance equivalent to an amount of movement in the circumferential direction centering around the axial line of the intermediary member in the pressing portion of the pressing piece caused due to the turning of the intermediary member. Therefore, in response to the turning of the intermediary member, it is possible to move the tubular member more efficiently in the axial line direction thereof.

In the seat driving apparatus according to the aspect of this disclosure, it is preferable that the counterface of the intermediary member pressed by the cam member includes a protrusion surface from which a pressed portion pressed by the cam member protrudes toward the cam member in a circumferential direction centering around the axial line of the intermediary member in accordance with the cam member turning toward the neutral position.

With this configuration, as the cam member approaches the neutral position, the pressed portion of the intermediary member pressed by the cam member protrudes toward the cam member in the circumferential direction centering around the axial line thereof due to the protrusion surface, and thus, the turning quantity of the intermediary member increases as much as thereof. Accordingly, it is possible to increase an amount of movement in the axial line direction of the tubular member which is pressed in response to the turning of the intermediary member.

In the seat driving apparatus according to the aspect of this disclosure, it is preferable that the input shaft that includes a fitting portion which is fitted into a fitting hole formed in the tubular member, and integrally rotates with the tubular member as the fitting portion is inserted into the fitting hole. In at least one of the fitting hole and the fitting portion, it is preferable to form a gradual change portion of which play between the fitting hole and the fitting portion increases in response to movement in the axial line direction in which the input shaft and the tubular member are separated from each other.

With this configuration, for example, even though the fitting hole and the fitting portion mesh with each other when the tubular member and the input shaft are integrally rotated, if the input shaft and the tubular member move slightly in the axial line direction so as to be separated from each other, the meshing state can be relaxed as much as the increased amount of play thereof. Thus, it is possible to smoothly release the fitted input shaft from the tubular member.

In the seat driving apparatus according to the aspect of this disclosure, it is preferable that the seat driving apparatus further includes an operation member that is provided to correspond to the positional adjustment mechanism, is joined to the cam member and is driven with the cam member, and the second biasing member holds the cam member at the neutral position by biasing the operation member so as to be held at the neutral position.

The aspect of this disclosure provides an effect in which a connection state between an input shaft and an output shaft can be reliably cut off.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat driving apparatus comprising:
a tubular member fitted with an output shaft leading to a positional adjustment mechanism, the output shaft being integrally rotatable and relatively movable in a first axial line direction with the tubular member, the tubular member being fitted with an input shaft which is integrally rotatable with the tubular member in response to movement in the first axial line direction toward the input shaft rotationally driven by a rotary motor, and the tubular member includes a tubular portion and a pressing piece protruding outwardly from the tubular portion;
a first biasing member that biases the tubular member in the axial line direction toward the input shaft;
an intermediary member turnable about a second axial line extending in a direction different from the first axial line direction of the tubular member, the tubular portion being loosely inserted into the intermediate member;
a cam member that is supported turnably around a third axial line extending in a direction different from the first axial line direction of the tubular member and the second axial line direction of the intermediary member, presses the pressing piece via the intermediary member so as to release the fitted input shaft from the tubular member against biasing force of the first biasing member by pressing a distal end portion of the intermediary member being separated from the second axial line of the intermediary member when being at a neutral position, and allows the input shaft to fit into the tubular member biased by the first biasing member in response to turning force from the neutral position; and
a second biasing member that biases the cam member to be held at the neutral position,
wherein a counterface of the intermediary member that presses the pressing piece includes a curved surface that is curved from one end to an other end such that a central portion of the intermediary member is projected toward the first axial line direction approaching the pressing plate in a state where the intermediary member is at a position to start to press the pressing piece, causing a pressing portion with which the pressing piece presses the intermediary member, to be separated from the second axial line of the intermediary member in accordance with the cam member turning toward the neutral position.

2. The seat driving apparatus according to claim 1, wherein the intermediary member is provided to be parallel to the pressing piece when seen from the intermediary member in the first axial line direction in a state where the input shaft is fitted into the tubular member.

3. The seat driving apparatus according to claim 1, wherein the counterface of the intermediary member pressed by the cam member includes a protrusion surface from which a pressed portion pressed by the cam member protrudes toward the cam member in a circumferential direction centering around the second axial line of the intermediary member in accordance with the cam member turning toward the neutral position.

4. The seat driving apparatus according to claim 1, wherein the input shaft includes a fitting portion fitted into a fitting hole formed in the tubular member, and the input shaft integrally rotates with the tubular member as the fitting portion is inserted into the fitting hole, and
wherein in at least one of the fitting hole and the fitting portion, a gradual change portion of which play between the fitting hole and the fitting portion increases is formed in response to movement in the first axial line direction in which the input shaft and the tubular member are separated from each other.

5. The seat driving apparatus according to claim 1, further comprising:
an operation member that is provided to correspond to the positional adjustment mechanism, the operation member being joined to the cam member and is driven with the cam member,
wherein the second biasing member holds the cam member at the neutral position by biasing the operation member so as to be held at the neutral position.

6. The seat driving apparatus according to claim 1, wherein a contact position of the intermediary member and the pressing portion moves away from the first axial line direction of the tubular member toward an end of the intermediary member which contacts with the cam member, as the cam member reaches a natural position.

* * * * *